United States Patent

[11] 3,597,803

| [72] | Inventor | Clarence R. Van Neil<br>North Olmsted, Ohio |
|---|---|---|
| [21] | Appl. No | 838,480 |
| [22] | Filed | July 2, 1969 |
| [45] | Patented | Aug. 10, 1971 |
| [73] | Assignee | Eaton Yale & Towne Inc.<br>Cleveland, Ohio |

[54] FASTENING DEVICE
10 Claims, 3 Drawing Figs.

| [52] | U.S. Cl. | 24/16 PB |
|---|---|---|
| [51] | Int. Cl. | B65d 63/00 |
| [50] | Field of Search | 40/21, 21<br>C; 24/16, 16 PB, 17, 17.1, 30.5 PB, 208—208.3 |

[56] References Cited
UNITED STATES PATENTS

| 3,072,986 | 1/1963 | Lefnaer | 24/16 PB |
| 3,086,265 | 4/1963 | Orenick et al. | 24/30.5 PB |
| 3,210,820 | 10/1965 | Humiston | 24/208.3 |

FOREIGN PATENTS

| Add.67,926 | 10/1957 | France | 24/208.3 |
| 1,468,568 | 12/1966 | France | 24/30.5 PB |
| 917,217 | 8/1954 | Germany | 24/16 PB |
| 667,640 | 9/1964 | Italy | 24/16 PB |

*Primary Examiner*—Donald A. Griffin
*Attorney*—Teare, Teare & Sammon

ABSTRACT: A fastening device including an elongated, flexible body having a tail end portion and a grip end portion providing a straplike construction for assembly around a bundle or the like. The grip end portion has an aperture therein and the body includes a plurality of spaced enlargements disposed between the end portions for resilient interlocking engagement with the margins of the aperture upon insertion of the tail end portion through the aperture for locking assembly with the bundle in the installed position thereof.

Patented Aug. 10, 1971 3,597,803
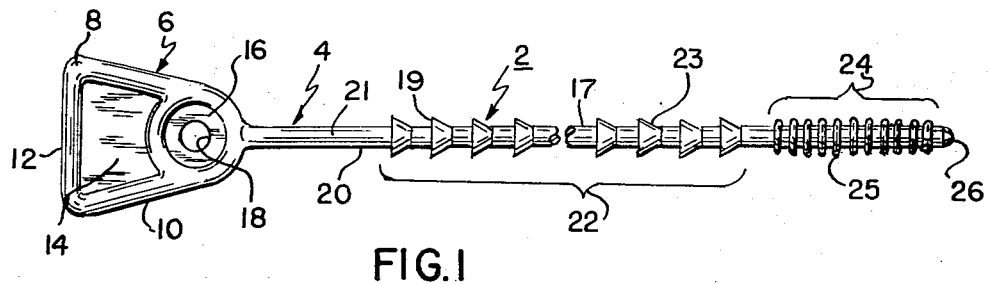
FIG.1
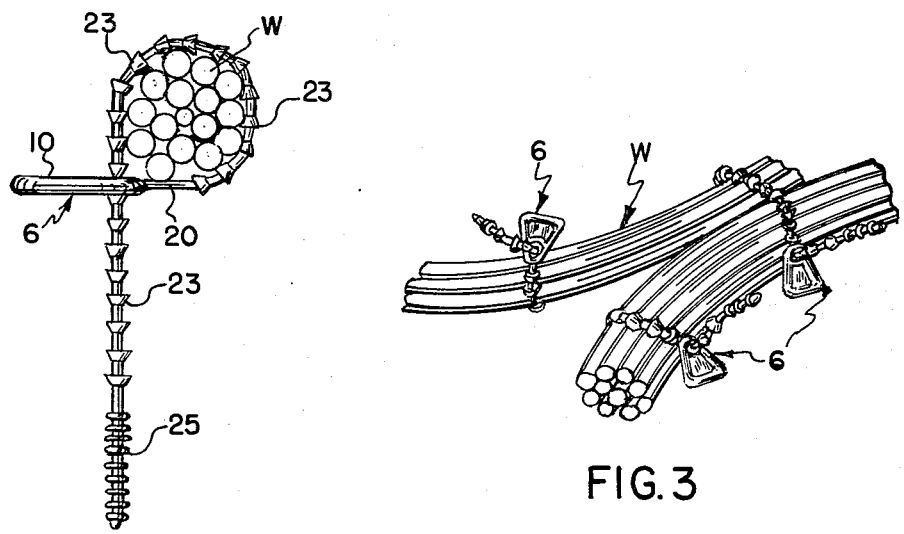
FIG.2
FIG.3
INVENTOR.
CLARENCE R. VAN NIEL
BY
Teare, Teare & Sammon
ATTORNEYS 3,597,803

1

FASTENING DEVICE

BACKGROUND OF THE INVENTION

This invention relates generally to fastening devices, and more particularly relates to an elongated, straplike fastening device made from a flexible polymeric material for fast-action assembly around a plurality of articles, such as a bundle of conductors, wire or the like.

Heretofore, various types of strap or clamplike arrangements have provided for assembly of a plurality of articles for mounting the same in stacked or bundled relation, but which arrangements have not been entirely satisfactory. Such arrangements have generally required selective assembly of the parts requiring a series of assembly operations and hence, are generally time consuming and cumbersome to install. Further, such arrangements were generally costly to produce and could not readily accommodate a wide range of sizes for a variety of applications. In addition, such prior arrangements often required special auxiliary tools or equipment in order to complete the assembly.

SUMMARY OF THE INVENTION

A fastening device comprising, an elongated flexible body having a tail end portion and a grip end portion, said grip end portion having an aperture therein, and said body having a plurality of spaced enlargements disposed between said end portions and adapted for resilient interlocking coacting engagement with the margins of said aperture upon insertion of said tail end portion through said aperture. The enlargements are made integral with said body and extend radially therefrom defining with said body a ratchetlike construction, said enlargements being spaced axially of said body and are of a generally frustoconical configuration tapering in a direction toward said tail end portion. The maximum transverse dimension of said enlargements is greater than the transverse dimension of the aperture in said grip end portion to provide a resilient deformation of the material of said grip end portion upon insertion of said tail end portion through said aperture. The device is preferably made from a flexible polymeric material with the grip end portion being of a generally planar construction, and said grip end portion being provided with at least one recesslike portion communicating with said aperture and providing an area of increased flexibility as compared to the remainder of said grip end portion.

By the foregoing arrangement there is provided a novel and improved construction for a fastening device made of a polymeric material for assembly, such as by wrapping or the like, around a plurality of articles, such as a bundle of conductors, wires, sheets, and other similar types of components. This arrangement is quick and easy to apply and requires no orientation or assembly of the parts is simple, and may be applied by quick manual manipulation or by means of conventional type tools, such as pliers or the like. The device includes a novel ratchetlike construction disposed between the grip end portion and the tail end portion which acts as an abutment means to retain the device in the assembled position. Further, such ratchetlike construction coacts with the respective articles to be assembled to prevent lateral shifting movement of the bundles in the assembled position thereof. The device can be made of any suitable predetermined length so as to readily accommodate a wide variation of bundle sizes, whereupon, the device may be trimmed off after assembly, as desired. The device lends itself to a wide variety of applications and can be quickly and simply installed by a single motion and which does not require special auxiliary tools or equipment to complete the installation thereof.

BRIEF DESCRIPTION OF THE DRAWINGS

FIG. 1 is a top plan view, partially showing the fastening device of the present invention;

2

FIG. 2 is a front elevation view on a reduced scale from FIG. 1, showing the fastening device of the invention in wrapped relation around a bundle of articles in accordance with the invention;

FIG. 3 is a fragmentary, generally perspective view showing a plurality of the fastening devices of the invention in wrapped relation around two bundles and for securing the bundles together in accordance with the invention.

DESCRIPTION OF THE PREFERRED EMBODIMENTS

Referring again to the drawings and in particular to FIG 1 thereof, there is illustrated the fastening device, designated generally at 2, embodied in the present invention illustrated for use in joining together a plurality of articles W such as conductors, wires or the like, as best seen in FIGS. 2 and 3. The device 2 is preferably made from a flexible polymeric material having good strength characteristics, such as tensile holding power, over a relatively wide temperature range. For example, in the invention such material may include linear polyethylene, nylon and the like. Such materials exhibit good flexibility and strength characteristics over a temperature range such as between about −40° F to 300° F.

In the embodiment shown, the device 2 includes a generally elongated body 4. The body 4 includes an integral grip end member 6 which is preferably of a generally polygonal, such as triangular shape, when viewed in top plan view, as seen in FIG. 1. The member 4 is of a generally thin construction having an integral upstanding rib 8 extending around the periphery thereof. The rib 8 is preferably disposed adjacent the tapered sides 10 of the member 6 and the base 12 of the member 6. The rib 8 is defined by a recess portion 14 which is formed out of the material on opposite sides of the member 6 to provide a gripping area to facilitate manual grasping of the member 6, as desired.

The opposite end of the grip end member 6 is preferably provided with another recess portion 16 formed out of the material on opposite sides thereof. Preferably, the recess portion 16 in the form shown is of a generally circular configuration when viewed in top plan. An aperture 18 having a generally circular shape is provided to extend through the recess portion 16 which defines a relatively thin marginal flange which surrounds and defines the aperture 18. Moreover, the recess or flange 16 has a relatively reduced thickness as compared to the thickness of the upstanding rib 8 so as to impart optimum flexibility to the area immediately surrounding the aperture 18 which has a predetermined diameter for the purposes as will be discussed hereinafter.

In the form shown, an elongated, flexible shanklike strap 20 extends generally centrally outwardly from the grip end member 6. The member 20 is preferably of a cylindrical configuration having a diameter which is less than the maximum thickness of the grip end member 6 but which is greater than the thickness of the recess of flange 16. The strap member includes a relatively smooth, uninterrupted end section 21, an intermediate ratchetlike section 22 and a roughened or grip end section 24 all of which are formed from the material of and made integral with the member 20.

As best seen in FIG. 1, the intermediate section 22 includes a ratchetlike construction defined by a plurality of axially spaced projections 23 which extend radially or annularly around the periphery of the strap member 20. Preferably, each of the projections 23 is of an identical construction with each projections 23 is of an identical construction with each projection preferably having a generally frustoconical configuration. Moreover, the projections each taper conically or convergently toward the strap member 20 in a direction away from the grip end member 6. Preferably, the projections are of a solid construction and define an endless annular abutment surface, as at 19, for coacting abutting engagement with the confronting surface provided by the recess or flange 16 in the grip end member 6 in the installed position thereof. The projections 23 are preferably axially spaced by integral interconnecting linklike portions 17 having a diameter approximately equal to that of the strap member 20 so as to provide a continuation thereof. The axial links of the portions 17 are at least equal to the thickness of the recess or flange portion 16 provided in the grip end member 6. In the invention, the maximum diameter of each of the projections 23 is preferably greater than the diameter of the aperture 18 in the grip end member 6. The minimum diameter of the projections 23 corresponds to the diameter of the portions 17 and may be slightly less, the same as, or slightly greater than the diameter of the aperture 18 in the grip end member 6 so as to provide a progressive resilient deformation of the recess or flange portion 16 during installation of the device 2, as will hereinafter be more fully described.

The section 24 provides a tail end construction for the strap member 20 and includes, in the embodiment shown, a plurality of axially spaced generally annular or ringlike elements 25. The elements 25 are preferably of a circular configuration and are formed out of and integral with the material of the strap member 20. Here again, the elements 25 are spaced axially from one another by a distance at least equal to the thickness of the recess or flange portion 16 of the grip end member 6. In the form shown, the elements 25 have a diameter less than that of the maximum diameter of the projections 23 and which may be equal to or slightly less than the diameter of the aperture 18 in the grip end member. The section 24 terminates in a pointed or rounded pilotlike end portion 26 to facilitate insertion thereof through the aperture 18 in the grip end member 6. Through the elements 25 have been illustrated as being of a generally similar diameter, it is to be understood that the elements may be of other shapes and/or sizes so as to increase progressively in diameter from the end portion 26 in a direction toward the intermediate section 22 to facilitate insertion through the aperture 18, as desired. By this arrangement, there is provided a serratedlike construction which provides a roughened grip area for manually grasping the tail end of the strap member 20 for pulling the same through the aperture 18 in the grip end member 6 during installation of the device. This arrangement also provides a relatively reduced diameter construction to facilitate alignment and assembly of the parts.

In a typical application, the device 2 may be employed for joining and holding together a plurality of articles W, such as conductors, wires or the like. This may be accomplished simply by inserting the tail end section 24 via the terminal end 26 through the aperture 18 from either side of the grip end member 6. After such initial insertion, the section 24 may be suitably grasped manually or by means of a conventional tool, such as pliers or the like, so that the length of the strap member 20 can be pulled through the aperture 18 for compressing or compacting the articles together, as seen in FIG. 2. During such insertion, the enlarged projections 23 act to outwardly expand or deform the material of the recess or flange portion 16 as each projection 23 is drawn progressively through the aperture 18. After the strap member 20 has been finally tightened around the bundle of articles W, the abutment surface 19 of the last successive projection 23 acts in coacting abutting engagement with the confronting surface of the recess or flange portion 16 so as to lock the strap member 20 in the final installed position.

During installation, the grip end member 6 may be suitably grasped by the operator in his other hand while the pulling force is applied to the tail end section 24. Should it be necessary to remove the strap member 20, it is necessary simply to apply a reverse pull on the strap member 20 which again acts to expand or deform the recess or flange 16 for disassembly of the parts. Furthermore, after the device 2 is finally wrapped around the bundle of articles W, for example, the excess length may then be trimmed off, as desired. Accordingly, the device 2 can be quickly and easily installed or removed to accommodate a relatively large range of article shapes and/or sizes and without destroying the device for repeated usage, as desired.

I claim:

1. A fastening device made from a flexible polymeric material for looplike assemblage around one or more articles comprising,
    a grip end member having a first recess portion formed from the material of and disposed on at least one side of said member,
    said recess portion having a generally circular aperture of predetermined diameter extending therethrough and disposed generally centrally thereof,
    said recess portion defining with said aperture a relatively thin marginal flange surrounding said aperture which flange has a reduced thickness as compared to the corresponding thickness of said grip member to provide relatively increased flexibility in the area immediately adjacent said aperture,
    an elongated, flexible shanklike strap made integral with and extending generally centrally outwardly from said grip end member,
    said shanklike strap terminating in an integral tail end portion,
    said shanklike strap including a plurality of axially spaced projections made integral therewith and disposed between said grip and tail end portions,
    said projections each being tapered generally convergently in a direction away from said grip end member, and
    the maximum transverse dimension of said projections being greater than the diameter of said aperture to provide a resilient interlocking coacting engagement with the marginal edge defined by said flange upon insertion of said tail end portion and said shanklike strap through said aperture for holding said device in locked assemblage in the installed position thereof.

2. A fastening device in accordance with claim 1, wherein said projections are each of a frustoconical configuration tapering in a direction toward said tail end portion to define a ratchetlike construction, and
the maximum diameter of each of said projections being greater than the diameter of said aperture 3. A fastening device in accordance with claim 2, wherein each of said projections is of a generally solid construction, and
each of said projections having an endless annular abutment surface adapted for coacting abutting engagement with the confronting surface provided by said flange in the installed position thereof.

4. A fastening device in accordance with claim 1, wherein said grip end member is of a generally flat construction,
said grip end member having a second recess portion formed from the material of said member and disposed outwardly of and opposite said first recess portion and
said second recess portion having a reduced thickness as compared to the corresponding thickness of said member to provide a gripping area to facilitate manual grasping of said member.

5. A fastening device in accordance with claim 1, wherein said shanklike strap is of a cylindrical configuration having a diameter greater than the thickness of said flange,
said strap member including a relatively smooth, uninterrupted section extending outwardly from said grip end member,
an intermediate ratchetlike section defined by said projections, and
said tail end portion which includes a plurality of axially spaced integral ringlike elements having a diameter which is less than the diameter of said aperture.

6. A fastening device in accordance with claim 1, wherein said shanklike strap is of a generally cylindrical configuration having a diameter greater than said recess portion,
said strap including a relatively smooth, uninterrupted end section made integral with and extending outwardly from said grip end member,
an intermediate ratchetlike section extending outwardly from said first-mentioned section,
a grip end section defining said tail end portion, and said projections made integral with said intermediate section and having a generally frustoconical configuration with a maximum diameter greater than the diameter of said aperture and a minimum diameter corresponding to that of said strap so as to merge with said strap in a direction toward said tail end portion.

7. A fastening device in accordance with claim 1, wherein said tail end portion includes a plurality of axially spaced ringlike elements, said ringlike elements made integral with said shanklike strap and being axially spaced apart a distance greater than the thickness of said flange.

8. A fastening device in accordance with claim 7, wherein said ringlike elements have a maximum diameter less than the diameter of said aperture and the maximum diameter of said projections.

9. A fastening device in accordance with claim 1, wherein said grip end member is of a generally polygonal configuration, in top plan view, said grip end member being of a generally planar construction including a second recess portion disposed centrally thereof and having a thickness generally corresponding to the thickness of said first recess portion.

10. A fastening device in accordance with claim 1, wherein said first recess portion is of a circular configuration, said aperture being generally concentrically disposed with relation to said first recess portion, and the thickness of the flange defined by said recess portion and aperture being less than the axial spacement between said projections.